United States Patent [19]

Baker

[11] 3,757,091

[45] Sept. 4, 1973

[54] AUTOMATIC RETRIEVAL APPARATUS

[75] Inventor: Ambrose D. Baker, Rochester, N.Y.

[73] Assignee: Eastman Kodak Company, Rochester, N.Y.

[22] Filed: Mar. 3, 1972

[21] Appl. No.: 231,478

[52] U.S. Cl. .......................... 235/61.11 E, 353/26

[51] Int. Cl. .......................... G06k 7/10, G03b 23/12

[58] Field of Search ................ 235/61.11 E; 353/25, 353/26; 88/24, 28; 250/219 R, 219 FR

[56] References Cited

UNITED STATES PATENTS

| | | | |
|---|---|---|---|
| 2,482,242 | 9/1949 | Brustman | 235/61.11 E |
| 2,757,865 | 8/1956 | Toulon | 235/61.11 E |
| 2,231,186 | 2/1941 | Gould | 235/61.11 E |
| 2,294,734 | 9/1942 | Bryce | 235/61.11 E |
| 3,036,765 | 5/1962 | Jones et al. | 235/61.11 E |
| 3,409,796 | 11/1968 | Money | 235/61.11 E |

*Primary Examiner*—Daryl W. Cook
*Attorney*—W. H. J. Kline et al.

[57] ABSTRACT

Apparatus for retrieving a particular microfilm document image from a film strip having a plurality of document images and an identifying code field for each such document image. Each identifying code field includes a plurality of binary information positions, with each such position having a selectable contrast (viz., light transmission capability) to either pass or substantially block light. The apparatus includes a reader station having a plurality of actuatable light sources, each light source being located relative to a particular bit position of an aligned code field in the reader station and operative when actuated to illuminate such position. The apparatus further includes a memory unit for storing information corresponding to a code field which identifies a particular document image and logic circuitry coupled to the storage unit for actuating particular light sources which correspond to those bit positions which substantially block light in the particular document image and a photosensitive device responsive to the absence of light passing through a document code field to indicate whether the particular document image is at the reader station.

2 Claims, 1 Drawing Figure

PATENTED SEP 4 1973
3,757,091
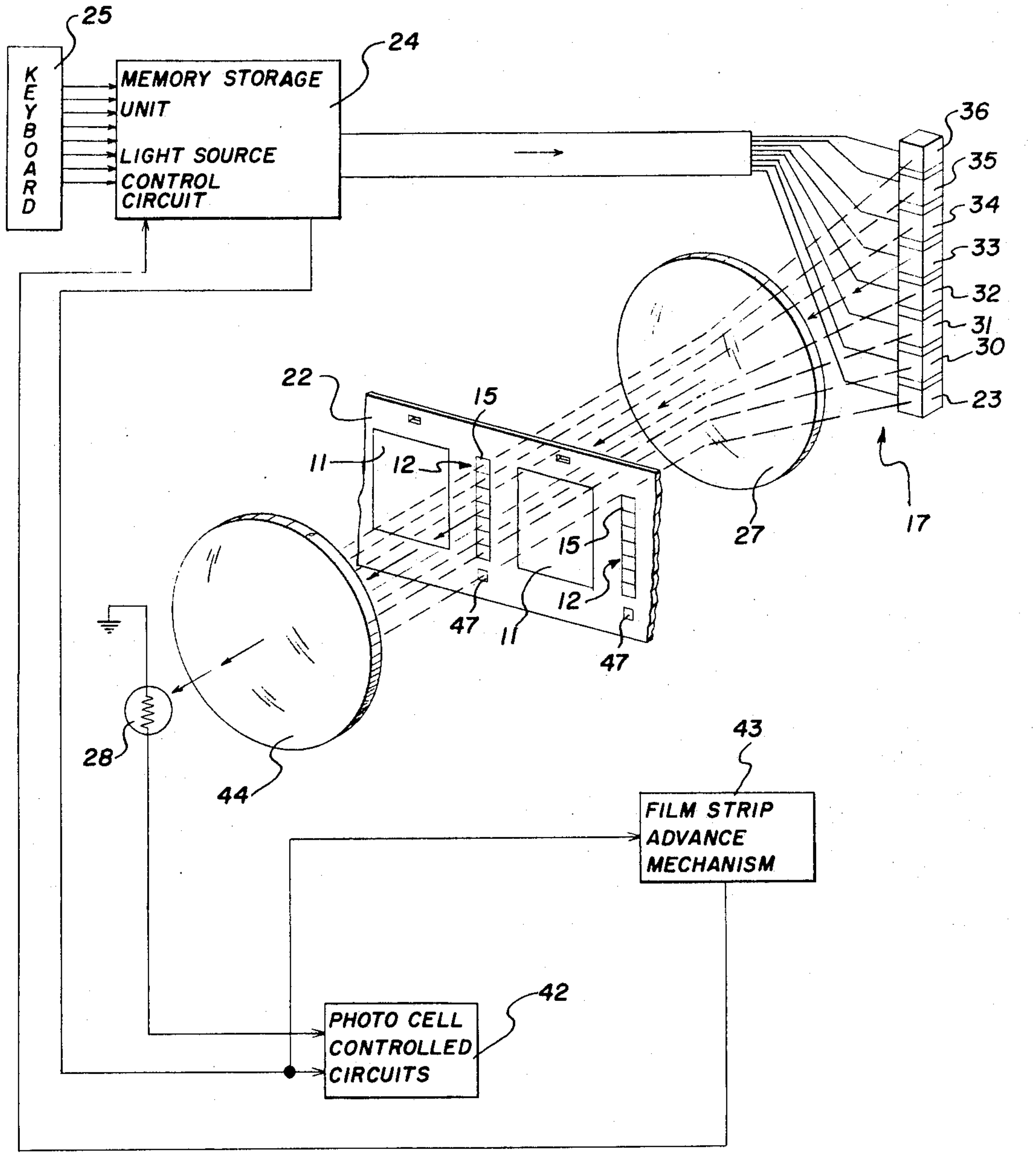

AUTOMATIC RETRIEVAL APPARATUS

CROSS REFERENCE TO RELATED APPLICATIONS

Reference is made to commonly assigned copending U. S. Pat. application Ser. No. 166,917, entitled, POSITIVE-NEGATIVE MICROFILM FILM READER, filed on July 28, 1971, in the name of Wayne Spani, the disclosure of which is incorporated in its entirety herein.

BACKGROUND OF THE INVENTION

1. Field Of The Invention

The present invention relates to information searching apparatus for retrieving information recorded on a medium such as film, and more particularly, to microfilm reader apparatus for retrieving a particular microfilm image from a plurality of images on a film strip.

2. Description Of The Prior Art

In microfilm information storage and retrieval systems, reduced document images are recorded on film. The reduction of size of document images provides a substantial reduction in document storage volume and simplifies mass handling of documents. Since literally thousands of document images may be stored on a reel of film, searching of these images utilizing visual techniques for retrieval of a particular document image is extremely time consuming. Automatic searching techniques have been developed which use film coding arrangements whereby each document image is accompanied by an identifying code field having a plurality of bit positions which contain digital information identifying such document image. Automatic microfilm reader apparatus have been provided to scan and decode the predetermined code fields. Typically, after locating a predetermined code field, the reader moves the identified document image to a projection station wherein the document image may be projected onto a viewing screen. An example of such a system is disclosed in commonly assigned U. S. Pat. No. 3,290,987 to James et al., wherein a reader station is provided which includes a plurality of photocells with each photocell being adapted to monitor and illuminate a particular bit position of a code field aligned in the reader station and produce an output digital signal representative of the contrast of such bit position, and logic means responsive to such digital signals to make a comparison with a code field stored in a memory unit to determine whether a particular document image corresponding to the stored code field is in the reader station. Such systems have performed quite satisfactorily but require complete decoding electronics.

In another system which eliminates the need for a complex decoding apparatus, a mask is positioned to blackout particular ones of the code field bit positions while permitting a light source to illuminate other ones of the bit positions. An example of such a blackout technique is disclosed in U. S. Pat. No. 2,580,270 to Bagdley et al. Typically, in a blackout system, particular bit positions of a code field are illuminated and the absence of light passing through the code field indicates that a code field with a predetermined information content is in the reader station. While such apparatus have performed satisfactorily, they have been complicated by the requirement of positioning masks in accurate registration with bit positions of a code field.

SUMMARY OF THE INVENTION

Accordingly, it is an object of the invention to provide an improved microfilm retriever apparatus which makes use of many of the advantages of blackout techniques such as eliminating the need for a complex decoding system and which further eliminates the need for the use of alignment masks.

In the disclosed embodiment of the invention, microfilm retrieval apparatus is disclosed for retrieving a particular document image or information image from the film having a plurality of images, with each image having an accompanying identifying code field including a plurality of binary bit positions and at least one timing mark which identifies the presence of the code field. The bit positions are each selected to have a light transmission capability (viz., contrast) which either substantially blocks or permits radiation in the visible light portion of the spectrum to pass therethrough. The apparatus includes means defining a reader station having a plurality of actuatable light sources, each of which is disposed relative to a particular bit position of a code field aligned at the reader station and which is operative when actuated for illuminating such particularly aligned bit position. The apparatus further includes means responsive to a code field timing mark or indicium, for aligning the code field at the reader station and actuating particular ones of light sources corresponding to bit positions in the predetermined code field being searched which substantially block radiation, and photosensitive means disposed at the reader station and responsive to the absence of radiation passing through the film from said activated light sources for a recognizing said predetermined code field.

BRIEF DESCRIPTION OF THE DRAWINGS

In a detailed description of the preferred embodiment of the invention presented below, reference is made to the accompanying drawing, the sole FIGURE of which is a schematic diagram partially in block form showing the general arrangement of an automatic microfilm document retrieval apparatus in accordance with the present invention.

DESCRIPTION OF THE PREFERRED EMBODIMENT

To facilitate an understanding of the present invention, reference is first made to that portion of the drawing which shows a microfilm film strip 22 which may be used in a microfilm reader system in accordance with the invention. The film strip 22 includes a plurality of information or document images 11 each of which is identified by a retrieval code field 12. The retrieval code field 12 includes one or more columns 15 with each column having a predetermined number of digital bit positions (seven in the illustrated embodiment). Adjacent to each column 15 is a column image position mark or indicium 47, sometimes referred to in the art as timing mark (TM). Each bit position of the column word 15 is in the form of an opaque or transparent rectangular area. For purposes of illustration, a code field having but a single column word 44 is shown disposed at the reader station. It will be understood that a code field may include as many columns as are needed to identify its corresponding document image. Further, the information pertinent to a particular search may be recorded in any selected ones of the columns preceding or following a document image and the apparatus in accordance with the present invention will be adapted to detect that particular information and retrieve a particular document image.

In the illustrated embodiment there is provided a reader station 17 and a film advancing mechanism 43 for moving the film in a forward or reverse direction relative to the station 17 or halting the film to align a particular document in the station. The reader station 17 includes a plurality of selectively actuatable light sources 30–36, each being operative when actuated to illuminate a single aligned bit position of a column word 15. Further, the reader station includes a light source 23 which, when energized, illuminates a relatively opaque timing mark 47. The light sources 23 and 30 through 36 may take various forms known in the art, some of which are commercially available such as light emitting diodes (LED) or incandescent gasious lamps. Still further, the reader station 17 includes a single lens 27 for projecting light from various actuated light sources to illuminate particular bit positions of the column 15 of a code field. When a light source is actuated and illuminates a low contrast bit position, light passes through the film strip 22 and is received by a lens 44 which is adapted to focus the light upon a single photocell 28. The photocell 28 in turn produces a signal having a parameter, the magnitude (in this case amplitude) of which is a function of the intensity of incident illumination.

In order to align a column word 15 at the reader station, the timing mark light source 23 is adapted to illuminate that area of the film strip wherein the timing mark 47 may be disposed. Light from the source 23 is modulated at a particular frequency and in the absence of a timing mark the photocell 28 will produce a signal at such a frequency. When the timing mark 47 is aligned at the reader station, however, because it has a high contrast, it blocks light from the light source 23 and the photocell 28 produces a signal which is substantially devoid of components near the particular frequency. The timing mark detecting circuitry 42 will be understood to include a bandpass filter adapted to pass the particular frequency and means coupled to the filter and adapted to detect the absence of such frequency component and produce a signal as an input to reader logic circuitry 43 which causes the film strip 22 to properly align the code field at the reader station. There are a number of commercially available timing mark detecting circuits known in the art which may also be used in accordance with the invention. The circuitry disclosed in commonly assigned copending U. S. Pat. application Ser. No. 166,917 entitled, POSITIVE-NEGATIVE MICROFILM FILM READER, filed July 28, 1971 in the name of Wayne Spani is especially suitable for use with the present invention. The reader 24 may take various forms known in the art, some of which are commercially available.

The disclosed apparatus further includes a memory storage unit and light source control circuit 24. The memory storage unit is conventional and receives and stores data from a keyboard 25 representative of a particular code field. The apparatus disclosed in the aforementioned Spani patent application Ser. No. 166,917 depicts an exemplary memory unit which is adapted to store data from a keyboard and includes a control unit for comparing such data with a decoded film column word, to determine if a desired document image is in the reader station. The keyboard 25 will be understood to include a series of buttons which would permit a user to enter a column word into the memory in the circuitry 24. A typical keyboard may be used in accordance with the present invention as shown in FIG. 1 of the aforesaid U. S. Pat. No. 3,290,987.

In operation, a user enters into the keyboard 25 information which describes a code field representative of a particular document image stored on the microfilm strip 22. After commencing the search, photocell 28 produces a signal having substantial frequency components in the modulated range of the light source until a timing mark 47 prevents light from the source 23 from reaching the photocell 28 at which time circuitry 42 provides a signal to the reader 24 causing it to align the accompanying column word 15 in registry before the plurality of light sources 30–36. Thereafter, the reader 43 produces a signal to the memory 24 which de-energizes the light source 23 and actuates or energizes particular ones of the light sources 30–36 to illuminate selected bit positions in accordance with the information stored in memory.

In accordance with the invention the light sources are energized which correspond to opaque bit positions of the code field in memory. If the photocell 28 should receive light above a predetermined intensity, indicating that a code field not having the desired information content is present at the reader station, the search is continued. Towards this end, circuitry 24 includes a timing circuit which after a predetermined interval produces a signal to the block 42 if the photocell 28 has produced a high level output signal. The reader 43 in response to this high level signal then continues the search and provides a signal to logic 24 to energize the lamp 23. If light has been substantially prevented from illuminating the photocell 28, however, the signal will be at a low level which indicates to the photocell control circuits 42 and the mechanism 43 that a hit condition has been reached (viz., a document image having the predetermined information content is disposed at the reader station and the search ends).

Although the present invention has described apparatus wherein the light sources 30-36 are simultaneously actuated, it will be understood that in apparatus in accordance with the invention they may be sequentially actuated.

The invention has been described in detail with particular reference to a preferred embodiment thereof, but it will be understood that variations and modifications can be effected within the spirit and scope of the invention.

I claim:

1. In automatic retrieval apparatus including means for positioning an information bearing medium having at least one information image and an identifying code field disposed adjacent thereto to align such code field in a reader station, the identifying code field having a plurality of information bit positions, with each position being selected to either pass or substantially block radiation in a predetermined portion of the spectrum, the apparatus further having means for storing in a memory unit a code field having an information content which identifies a particular information image, the combination comprising:

a. a plurality of actuatable light sources of radiation at said reader station, each of said sources being operative when actuated to illuminate a particular bit position of an aligned code field;

b. means actuatable by said memory unit for actuating those particular ones of said light sources which would be substantially blocked by an aligned code field corresponding to the particular information image; and c. photosensitive means disposed at said reader station and responsive to the absence of radiation from said actuated light sources for producing a signal indicating that the aligned code field corresponds to the particular information image.

2. The combination as set forth in claim 1 wherein said photosensitive means is a single photocell.

* * * * *